United States Patent [19]
Fischer

[11] Patent Number: 5,931,497
[45] Date of Patent: Aug. 3, 1999

[54] GAS BAG

[75] Inventor: Anton Fischer, Heuchlingen, Germany

[73] Assignee: TRW Occupant Restraint Systems GmbH, Alfdorf, Germany

[21] Appl. No.: 08/861,895

[22] Filed: May 22, 1997

[30] Foreign Application Priority Data

May 31, 1996 [DE] Germany ........................ 296 09 703 U

[51] Int. Cl.⁶ .................................................. B60R 21/28
[52] U.S. Cl. ...................... 280/743.1; 280/735; 280/739; 280/741; 280/743.2
[58] Field of Search ............................ 280/743.1, 743.2, 280/742, 739, 735, 738, 741

[56] References Cited

U.S. PATENT DOCUMENTS

| | | | |
|---|---|---|---|
| 4,966,389 | 10/1990 | Takada | 280/743.2 |
| 5,071,160 | 12/1991 | White et al. | 280/735 |
| 5,246,250 | 9/1993 | Wolanin et al. | 280/743.1 |
| 5,405,166 | 4/1995 | Rogerson | 280/728.1 |
| 5,411,289 | 5/1995 | Smith et al. | 280/735 |
| 5,413,378 | 5/1995 | Steffens, Jr. et al. | |
| 5,460,405 | 10/1995 | Faigle et al. | |
| 5,492,363 | 2/1996 | Harmeyer et al. | |

FOREIGN PATENT DOCUMENTS

| | | |
|---|---|---|
| 0670247 | 9/1995 | European Pat. Off. |
| 5213143 | 8/1993 | Japan |
| 725309 | 1/1995 | Japan |
| 730164 | 6/1995 | Japan |
| 7329694 | 12/1995 | Japan |
| 3030607 | 8/1996 | Japan |
| WO9503953 | 2/1995 | WIPO |

*Primary Examiner*—Eric D. Culbreth
*Attorney, Agent, or Firm*—Tarolli, Sundheim, Covell, Tummino & Szabo

[57] ABSTRACT

A gas bag for a vehicle occupant restraining system is inflatable from a folded to an inflated state in case of an accident. The gas bag includes a gas bag wall which is defined by several fabric layers being superposed in the inflated state. The gas bag has at least one discharge opening with a cross section. The fabric layers have openings which overlap each other to define the discharge opening and can be displaced relative to each other dependent on the internal gas bag pressure to vary the cross section of the discharge opening.

12 Claims, 3 Drawing Sheets

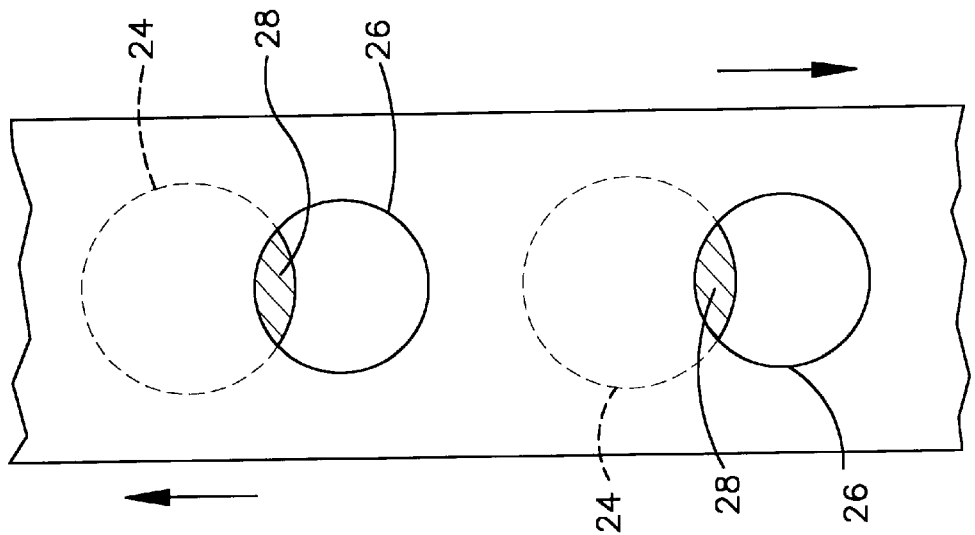
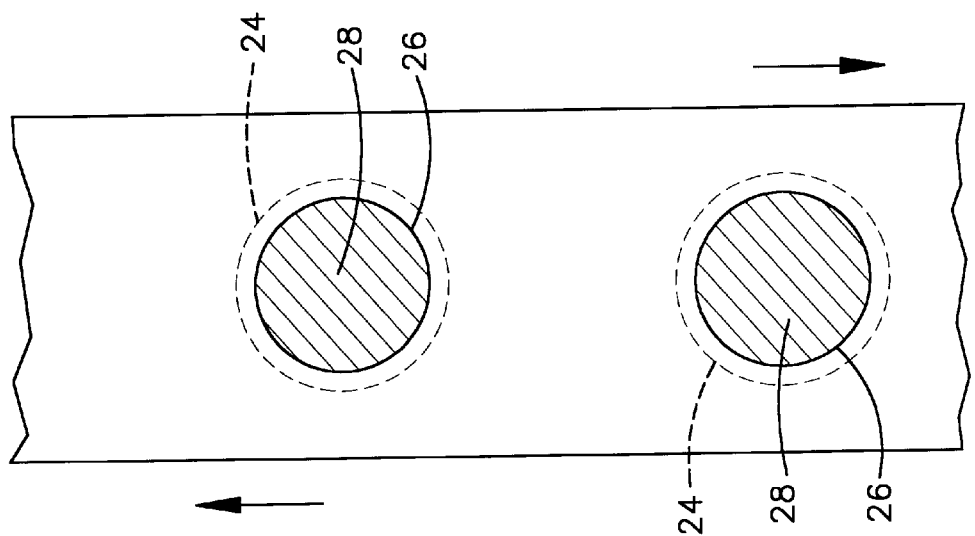
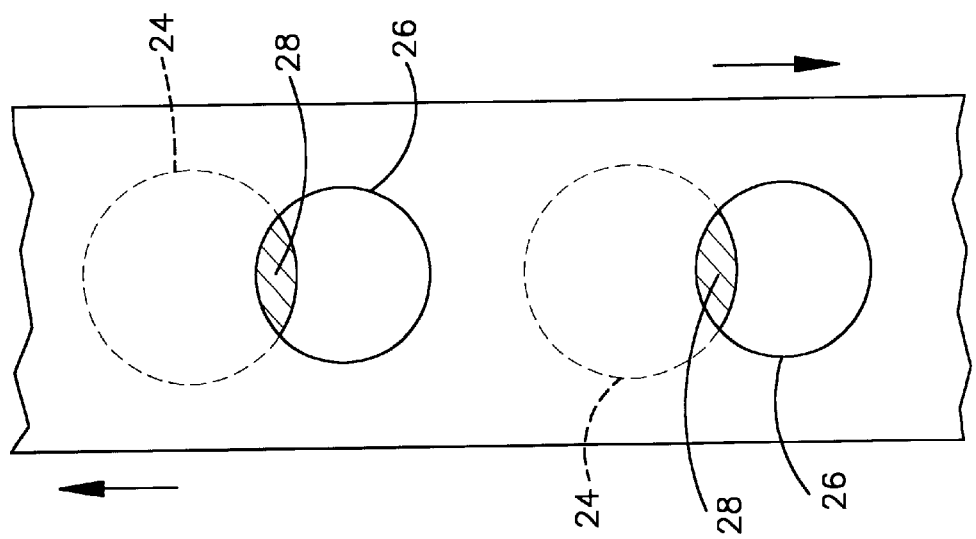

GAS BAG

TECHNICAL FIELD

The invention relates to a gas bag for a vehicle occupant restraining system.

BACKGROUND OF THE INVENTION

In the case of gas bags so far proposed having a discharge opening whose cross section is adapted to be varied, the discharge opening is arranged concealed in the gas bag fabric in a section thereof which is puckered up by a rippable seam. Such rippable seam is destroyed when a certain gas pressure within the gas bag is reached so that it is only at this interior pressure level the discharge opening is cleared and the gas may flow out from the interior of the gas bag in order to reduce the internal pressure of the gas bag. Owing to the reduced internal pressure, the gas bag becomes softer.

Conventional forms of gas bag restraining systems are designed for an average body weight. However, for an optimum restraining action, the gas bag should be softer in the case of lighter occupants, whereas, in the case of a larger body weight, a harder gas bag is required in order to fully prevent impact through the gas bag.

BRIEF DESCRIPTION OF THE INVENTION

The invention provides a gas bag with a discharge opening so that with essentially the same bag design it is possible for the gas bag manufacturer to obtain different evolutions of variations in cross section of the discharge opening as a function of the internal pressure in the gas bag. Without changing the principle, it is possible to produce different gas bags which, for example, either open or close at a higher internal bag pressure. The gas bag for a vehicle occupant restraining system according to the present invention is inflatable from a folded to an inflated state in case of an accident. The gas bag comprises a gas bag wall which is defined by several fabric layers being superposed in the inflated state. The gas bag has at least one discharge opening with a cross section. The fabric layers have openings which overlap each other to define the discharge opening and are adapted to be displaced relative to each other dependent on the internal gas bag pressure to vary the cross section of the discharge opening.

Accordingly it is now possible, simply by having different arrangements of the fabric layers, which are able to be slid in relation to each other, to determine whether the discharge opening is to open or to close at a higher gas bag internal pressure without basically different parts having to be utilized. Furthermore, the principle of the gas bag of the invention renders it possible, without changes in components, to also provide discharge openings which may be changed over not only from an opened to a closed state or vice versa, but, furthermore, from a partially to a completely opened state or vice versa.

In accordance with a first preferred embodiment of the gas bag of the invention, the variation in the cross section is preferably not reversible. This is something able to be achieved for instance by an external fabric layer being sewn in a puckered manner with a rippable seam and by providing a contiguous internal fabric layer which has folds in the overlapped region of the fabric layers in the inflated state of the gas bag, before any rupture of the rippable seam. The internal fabric layer is thus not completely unfolded in the overlapped region of the fabric layers and passes on the forces, due to the internal pressure of the gas bag, to the external fabric layer which is loaded and, when a certain internal pressure of the gas bag is reached, is torn open so that the fabric layers may be displaced in steps owing to the change in length of the external fabric layer.

According to a second embodiment of the invention, the change in cross section is reversible. This is possible if, for example, at least one elastic tape has two opposite ends thereof which are attached to a fabric layer. The elastic tape partly shortens the layer in the case of a low internal pressure of the gas bag and, accordingly, puckers it. With an increase in the internal pressure of the gas bag, the elastic tape stretches so that a reversible relative movement may take place between the fabric layers with the result that the degree of overlap of the openings and the cross section of the discharge opening also change proportionally to the change in the internal pressure of the gas bag. One simple way of attachment of the fabric layers to one another is possible, if same are sewn together by the circumferential seam, provided in any case, at the inflation aperture of the gas bag. The circumferential seam may also serve for attachment of the elastic tape.

The two fabric layers do not have to be large in area since it is sufficient if the one fabric layer constitutes the gas bag as such and the other fabric layer is strip-like and is without any direct vehicle occupant restraining function, but merely renders possible the change in the cross section of the discharge opening.

Furthermore, the invention creates a restraining system for vehicle occupants using a gas bag in accordance with the invention and a multiple stage gas generator for the production of different internal pressures in the gas bag as dependent on a vehicle impact and/or the stature of the vehicle occupant. Using the internal pressure of the gas bag, it is, therefore, possible to control the cross section of the discharge openings and, accordingly, the condition of the gas bag after the start of inflation. Factors which are controlling for the internal pressure of the gas bag are, for example, the intensity of impact and the weight of the vehicle occupant, same being able to be detected by means of suitable sensors.

BRIEF DESCRIPTION OF THE DRAWINGS

FIGS. 6a through 6c show the change in the cross section of the discharge opening of the gas bag of FIGS. 4 and 5 with an increasing internal pressure therein.

DETAILED DESCRIPTION OF PREFERRED EMBODIMENTS

Figure 1:
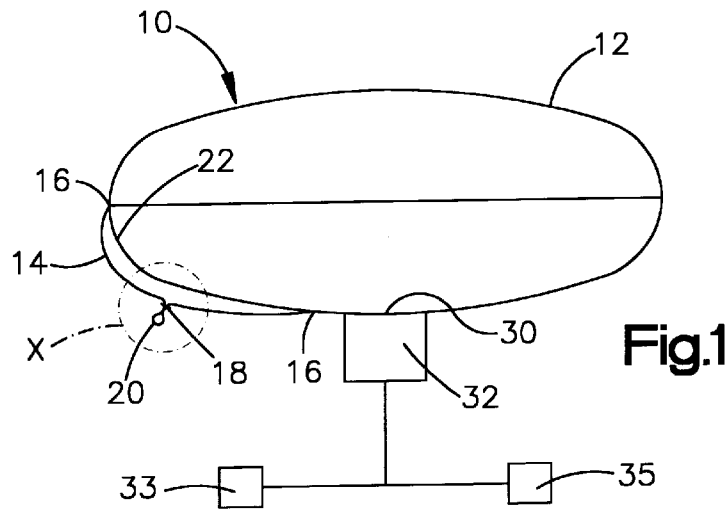
FIG. 1 is a stylized sectional view taken through the gas bag of the invention in accordance with a first embodiment as a part of the restraining system in accordance with the invention with a rippable seam on the outer fabric layer.
Figure 2:
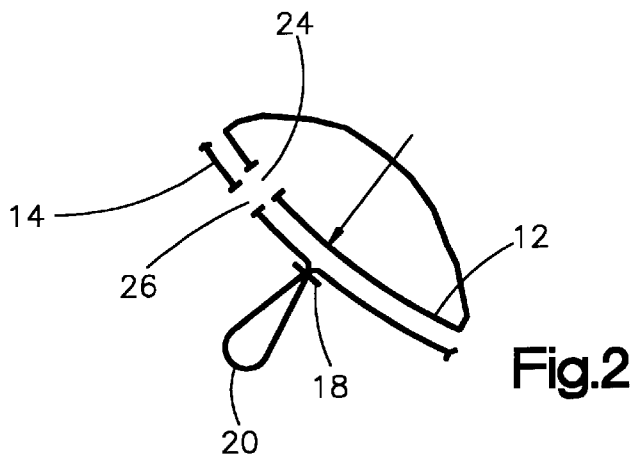
FIG. 2 shows a view on a larger scale of the portion denoted by X in FIG. 1.
Figure 3A:
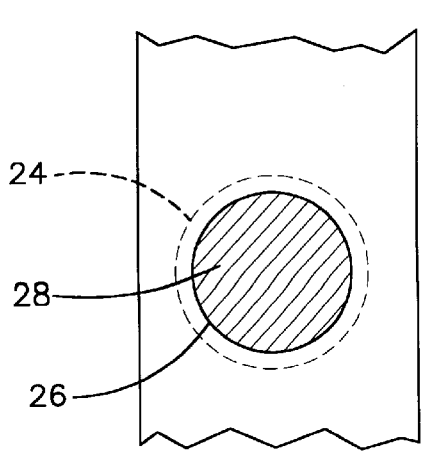
FIGS. 3a and 3b show a plan view of the external, strip-like fabric layer adjacent to the discharge opening at a low and, respectively, at a high internal pressure of the gas bag.
Figure 3B:
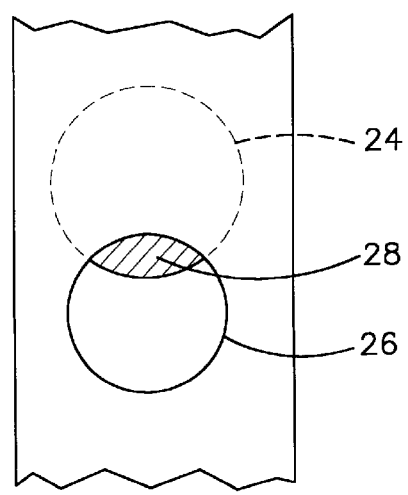
Figure 4:
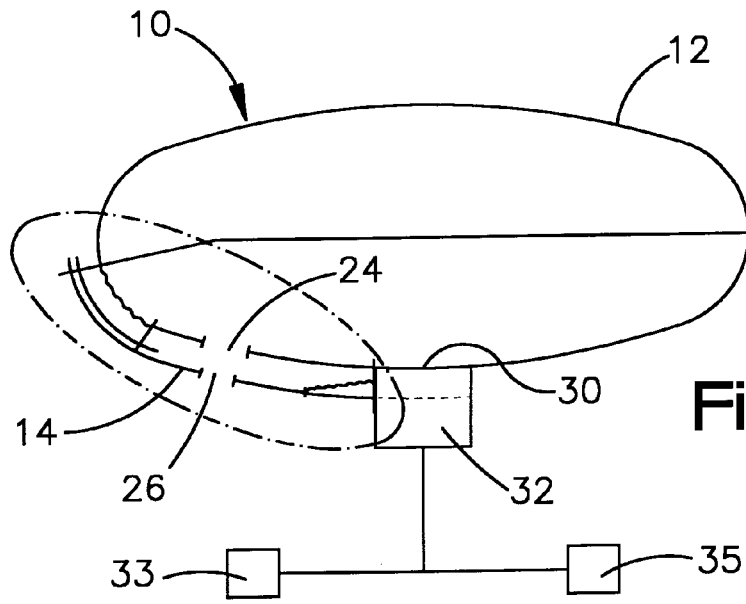
FIG. 4 shows a schematic stylized sectional view of the gas bag of the invention in accordance with a second embodiment with elastic tapes sewn to the fabric layers.
Figure 5:
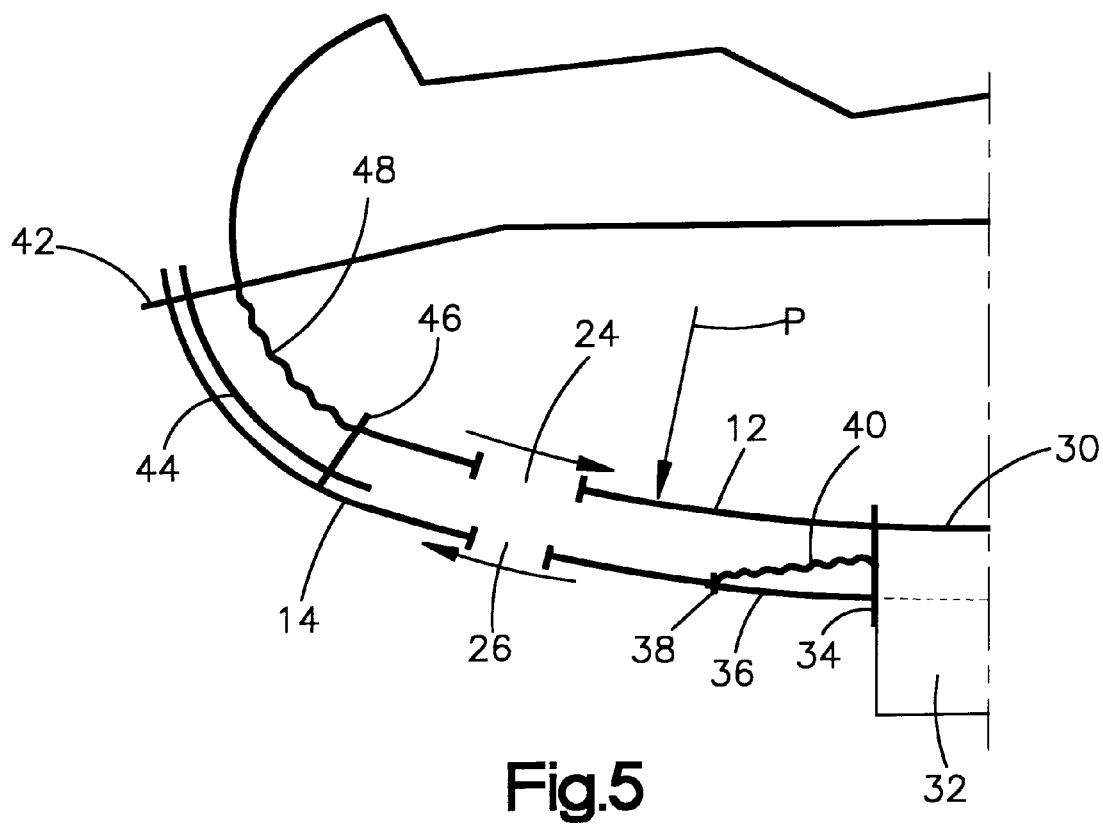
FIG. 5 shows a schematic view on a larger scale of the portion marked X in FIG. 4.

FIG. 1 shows a first embodiment of a gas bag 10 which for example may be arranged in the hub of a steering wheel or in the dash of a vehicle adjacent to the co-driver. The gas bag 10 comprises a fabric layer 12, having two parts, which as such constitutes a complete gas bag, and a strip-like, external fabric layer 14. At narrow edges 16 thereof the external fabric layer 14 is sewn to the internal fabric layer 12. In the inflated condition of the gas bag 10 as illustrated in FIG. 1 the external fabric layer 14 is completely drawn taut against the internal fabric layer 12, a lateral gap being shown in FIGS. 1 and 2, which is not actually present in practice, in order to distinguish between the two layers. The external fabric layer 14 has a rippable seam 18 extending athwart its longitudinal direction, such seam serving to produce a puckered or gathered region 20 of the fabric layer 14. The external fabric layer 14 is so stitched to the internal fabric layer 12 that in the inflated state of the gas bag 10, while the rippable seam 18 is still intact, folds 22 are produced in the internal fabric layer 12 between the edges 16 and, in the condition illustrated in FIG. 1, the internal fabric layer 12 is not completely drawn taut in the overlapped region of the fabric layers 12, 14. In the overlapping region a plurality of openings is present both in the internal and also in the external fabric layer 12 and, respectively, 14. In order to render FIGS. 2 and 3 more straightforward only one opening 24 is illustrated in the internal fabric layer 12 and only one opening 26 in the external fabric layer 14. The openings 24 and 26 are in this case so arranged relative to one another that, at a certain internal gas bag pressure which is insufficient to tear open the seam 18, they completely overlap as shown in FIG. 3a so that the discharge opening 28 resulting from the overlap of the openings 24 and 26 has a maximum discharge flow cross section, same being shaded in the drawing. The interior of the gas bag is in communication with the surroundings by way of the discharge opening 28.

The manner of operation of the gas bag depicted in FIGS. 1 through 3b will now be briefly described. In case of an accident, gas produced by a multiple stage gas generator 32 as is well known in the art will flow via an inflation aperture 30 into the interior of the gas bag in order to deploy the gas bag 10.

A sensor 33 for sensing the weight of a vehicle occupant in the vehicle as a part of a restraining system, which includes the gas bag 10 and the multiple stage gas generator 32, ascertains the weight of the vehicle occupant and controls the amount of gas produced by the gas generator 32 in a manner dependent on weight. This is for example performed by activating different numbers of stages of the gas generator 32. In the condition of the gas bag 10 depicted in FIG. 1, such bag is completely inflated and set for a vehicle occupant of average stature or a weight above a predetermined threshold. That is to say, the rippable seam 18 will remain intact at least until the completely inflated condition has been reached so that, in the case of a vehicle occupant of average stature, the gas bag 10 is provided with the large discharge opening 28 depicted in FIG. 3a. The discharge opening 28 serves to endow the gas bag 10 with a certain degree of softness and a tendency to yield, when the vehicle occupant plunges into the gas bag 10 so that during such plunging motion gas will emerge into the surroundings via the discharge opening 28.

In the case of a heavy vehicle passenger a second stage of the gas generator 32 is activated so that a higher internal pressure of the gas bag results. It is symbolized by the arrow P in FIG. 2. Since the external fabric layer 14 is fully drawn taut even at a low internal pressure of the gas bag (but the internal fabric layer 12 has folds 22 in this pressure range), the forces caused by the internal pressure P in the overlapping part of the fabric layers 12 and 14 must be exclusively taken up by the external fabric layer 14. The rippable seam 18 is, however, so designed that it cannot resist a higher internal pressure and will tear, for which reason the effective length of the external fabric layer 14 is increased and the gas bag 10 will be still further inflated in this region. Owing to the change in length of the external fabric layer 14 same will be displaced together with its opening 26 in relation to the internal fabric layer 12 together with its opening 24 into the position indicated in FIG. 3b. The resulting cross section of the discharge opening 28 is here smaller than in the condition illustrated in FIG. 3a. Owing to the greater inflation of the gas bag 10 and owing to the discharge opening 28 with a smaller cross section the gas bag 10 is harder or more turgid than in the condition indicated in FIG. 3a. Heavier vehicle passengers can hence not impact the structure behind the gas bag, that is to say the steering wheel or the dash. A sensor 35 for sensing the severity of the vehicle impact can be used instead of or along with the sensor 33. The stages of the multiple stage gas generator 32 can be activated depending on the vehicle impact.

Conversely it is, however, possible for the openings 24 and 26 to be so arranged in relation to one another that the discharge opening 28 completely closes with an increase in the internal gas pressure in the gas bag or that, vice versa, with an increase in the internal gas pressure in the gas bag it will have a smaller cross section or will even be fully closed. This may for example be an advantage if the gas bag 10 is to be utilized in a restraining system which is adapted to operate independently of the weight of the vehicle occupant and which provides that the discharge opening is closed to prevent an excessive rate of flow of gas from the gas bag 10 at a high internal pressure of the gas bag, for example when the occupant plunges into the gas bag.

In the illustrated working embodiment illustrated in FIGS. 1 through 3b the discharge opening 28 changes in cross section in steps irreversibly in a manner dependent on the tearing open of the seam 18.

The second embodiment of the gas bag illustrated in FIGS. 4 through 6b is characterized by discharge openings 28, whose cross section may be changed steplessly and reversibly in a fashion dependent on the internal pressure of the gas bag. Parts which correspond to the parts employed in the first embodiment are in this case denoted by like reference numerals. The second embodiment of the gas bag 10 as well comprises an internal fabric layer 12 and a strip-like, external fabric layer 14, in a sort of sandwich structure or laminate. The inflation aperture 30, which constitutes the connection with a multiple stage gas generator 32, possesses a circumferential seam 34. An elastic tape 36 placed on the external fabric layer 14 adjacent to the edge thereof is connected via the circumferential seam 34 with the internal and the external fabric layer 12 and 14. Relative to the external fabric layer 14 the tape 36 is short and has its end opposite to the circumferential seam 34 only connected with the external fabric layer 14 in such a manner that it puckers up the external fabric layer 14 between the seams 34 and 38 and that folds 40 are provided. At the opposite end of the external fabric layer 14 the same is connected by a seam 42 with a further elastic tape 44 and the internal fabric layer 12. The elastic tape 44 extends between the fabric layers 12 and 14 toward the elastic tape 36 without reaching it. At its end remote from the seam 42 it is connected with the internal fabric layer 12 by a seam 46. The elastic tape 44 causes puckering of the part of the fabric layer 12 between the seams 42 and 46 so that folds 48 are produced here. Openings 24 and 26 in the layers 12 and 14 are located between the seams 38 and 46. In the condition of the gas bag 10 illustrated in FIGS. 4 and 5, in which there is a low internal gas pressure, the openings 24 and 26 in the inner fabric layer 12 and, respectively, the external fabric layer 14, partly overlap as shown in FIG. 6a so that discharge openings 28 are formed with a small cross section.

The manner of operation of the second embodiment of the gas bag 10 will now be explained with reference to FIGS. 4 through 6c. In case of an accident, pyrotechnical material is ignited in the gas generator 32 so that gas is produced which is discharged via the inflation aperture 30 into the interior of the gas bag 10 and inflates same to obtain the condition illustrated in FIGS. 4, 5 and 6a. Gas will then flow off into the surroundings via the discharge openings 28 having a relatively small cross section. When the vehicle occupant impinges against the gas bag 10 a higher internal gas pressure P (see FIG. 5) will be produced, which means that the elastic tapes 36 and 44 are further stretched and the folds 40 and 48 are at least partly removed. There is accordingly a displacement of the fabric layers 12 and 14 in relation to each other as is indicated by the arrows in FIG. 5. Owing to the relative motion there is also a displacement of the openings 24 and 26 in relation to each other so that the discharge openings 28 will have a larger cross section (see FIG. 6b). The relatively large discharge openings 28 ensure that the gas bag 10 is relatively soft when the initial plunging movement of the vehicle occupant into the gas bag 10 causes its internal pressure to increase. However then subsequently, when the greater part of the momentum of the vehicle occupant has been taken up by the gas bag 10 and the internal pressure is reduced further, the tapes 36 and 44 contract again and the cross section of the discharge openings 28 is reduced. This offers the advantage that it is not possible for so much gas to be discharged that the gas bag 10 prematurely collapses.

The second embodiment of the gas bag 10 may also be a component of a complete vehicle occupant restraining system having sensor 33 for sensing the weight of a vehicle occupant and sensor 35 for sensing the severity of a vehicle impact, in the case of which the internal pressure of the gas bag 10 is able to be controlled using the multiple stage gas generator 32. The internal pressure of the gas bag is also indirectly controlling the cross section of the discharge openings 28 so that the gas bag 10 may be employed for different systems of timed events, for example as dependent on the volume of the gas bag and internal pressures of the gas bag as desired at certain points in time after an accident. The second embodiment of the gas bag 10 as well may for example be integrated in a restraining system, for instance so that, in an arrangement which is the reverse of that of FIGS. 6a through 6c, the discharge openings 28 are fully closed at the maximum internal pressure of the gas bag or have a small cross section in order to render the gas bag 10 hard, whereas at a lower internal pressure of the gas bag they are partially or completely closed.

The discharge characteristics of the gas coming from the gas bag 10 can accordingly be set just as desired by setting the position and size of the discharge openings and of the return force of the tapes 36 and 44 or of the strength of the rippable seam 18. It is possible to create different gas bags 10 without changes in parts, for example simply by fastening the external fabric layer 14 at a slightly different position on the internal fabric layer 12.

I claim:

1. A gas bag for a vehicle occupant restraining system being inflatable from a folded to an inflated state in case of an accident, comprising a gas bag wall which is defined by several fabric layers being superposed in said inflated state and which has at least one discharge opening with a cross section, said fabric layers having openings which overlap each other to define said discharge opening and being adapted to be displaced relative to each other dependent on the internal gas bag pressure to vary said cross section of said discharge opening, a change in said cross section being reversible.

2. The gas bag as claimed in claim 1, wherein said discharge opening is adapted to be opened or at least partially closed upon reaching a certain internal gas pressure.

3. The gas bag as claimed in claim 1, wherein said cross section of said discharge opening is adapted to increase with a higher internal gas pressure.

4. The gas bag as claimed in claim 1, wherein at least one elastic tape with two opposite ends is provided which is attached to one of said fabric layers at said ends to shorten said layer at a low internal pressure of said gas bag and, accordingly, to pucker it.

5. The gas bag as claimed in claim 4, wherein each of said fabric layers comprises an elastic tape for puckering the corresponding fabric layer.

6. The gas bag as claimed in claim 5, wherein said elastic tapes of the fabric layers are secured on said fabric layers at positions which are opposite in relation to said openings.

7. The gas bag as claimed in claim 5, wherein said gas bag has an inflation aperture and wherein at least one circumferential seam is provided by means of which said fabric layers are stitched together at said inflation aperture.

8. The gas bag as claimed in claim 7, wherein said circumferential seam at said inflation aperture is also adapted to serve for attachment of said elastic tape.

9. The gas bag as claimed in claim 1, wherein said gas bag has an inflation aperture and wherein at least one circumferential seam is provided by means of which said fabric layers are stitched together at said inflation aperture.

10. The gas bag as claimed in claim 1, wherein an external one of said fabric layers is a fabric strip having long sides and short sides at which said layer is secured to an internal one of said fabric layers, each of said short sides being shorter than each of said long sides.

11. A restraining system for a vehicle occupant, comprising a gas bag as claimed in claim 1 and a multiple stage gas generator for the production of different internal gas bag pressures in a fashion dependent on at least one of a vehicle impact and the stature of the vehicle occupant.

12. The restraining system as claimed in claim 11, wherein said gas generator is so controlled that, in the case of a vehicle occupant with a weight above a predetermined threshold, it produces a higher internal pressure in said gas bag.

* * * * *